US012162447B2

(12) United States Patent
Schnittger

(10) Patent No.: US 12,162,447 B2
(45) Date of Patent: Dec. 10, 2024

(54) PARKING BRAKE DEVICE FOR A UTILITY VEHICLE

(71) Applicant: KNORR-BREMSE Systeme fuer Nutzfahrzeuge GmbH, Munich (DE)

(72) Inventor: Karsten Schnittger, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 452 days.

(21) Appl. No.: 17/626,356

(22) PCT Filed: Jul. 9, 2020

(86) PCT No.: PCT/EP2020/069412
§ 371 (c)(1),
(2) Date: Jan. 11, 2022

(87) PCT Pub. No.: WO2021/009007
PCT Pub. Date: Jan. 21, 2021

(65) Prior Publication Data
US 2022/0258712 A1 Aug. 18, 2022

(30) Foreign Application Priority Data

Jul. 12, 2019 (DE) ...................... 10 2019 118 895.4

(51) Int. Cl.
*B60T 13/68* (2006.01)
*B60T 13/38* (2006.01)
*B60T 15/04* (2006.01)

(52) U.S. Cl.
CPC .......... *B60T 13/683* (2013.01); *B60T 13/385* (2013.01); *B60T 15/041* (2013.01); *B60T 2270/402* (2013.01); *B60T 2270/413* (2013.01)

(58) Field of Classification Search
CPC .... B60T 13/683; B60T 13/385; B60T 15/041; B60T 2270/402; B60T 2270/413
(Continued)

(56) References Cited

U.S. PATENT DOCUMENTS 7,866,761 B2 * 1/2011 Gerum .................... B60T 8/321
303/127
10,093,293 B2 * 10/2018 Lülfing ................. B60T 13/683
(Continued)

FOREIGN PATENT DOCUMENTS

CN 1880138 A 12/2006
CN 1935569 A 3/2007
(Continued)

OTHER PUBLICATIONS

Chinese-language Office Action issued in Chinese Application No. 202080050839.X dated Mar. 30, 2023 with English translation (13 pages).
(Continued)

*Primary Examiner* — Christopher P Schwartz
(74) *Attorney, Agent, or Firm* — Crowell & Moring LLP

(57) ABSTRACT

A parking brake device with at least one first connector line to a compressed air source and with at least one second connector line to a compressed air source, includes at least one electronically actuable bistable valve arrangement for the actuation of a spring brake cylinder and at least one further electronically actuable redundancy control valve arrangement for the actuation of a redundant brake system. At least one first control electronics module and at least one second control electronics module are provided which can be operated independently of one another. The bistable valve arrangement can be actuated via the first control electronics module, and, independently thereof, the redundancy control valve arrangement can be actuated via the second control electronics module.

15 Claims, 11 Drawing Sheets

(58) Field of Classification Search
USPC ......... 303/3, 7, 9.61, 13, 15, 20, 118.1, 122, 303/122.03, 122.04, 122.05, 122.08, 127
See application file for complete search history.

(56) References Cited

U.S. PATENT DOCUMENTS

| | | | |
|---|---|---|---|
| 11,338,783 B2* | 5/2022 | van Thiel | B60T 13/683 |
| 11,440,521 B2* | 9/2022 | Van Thiel | B60T 15/043 |
| 11,491,963 B2* | 11/2022 | Van Thiel | B60T 13/26 |
| 11,702,054 B2* | 7/2023 | Henderson | B60T 13/662 303/118.1 |
| 11,807,203 B2* | 11/2023 | Adler | B60T 13/662 |
| 2005/0029859 A1 | 2/2005 | Bensch et al. | |
| 2006/0284479 A1 | 12/2006 | Hoover et al. | |
| 2006/0284480 A1 | 12/2006 | Rudolph et al. | |
| 2018/0251112 A1 | 9/2018 | Griesser et al. | |
| 2019/0152459 A1* | 5/2019 | Dieckmann | B60T 13/662 |
| 2019/0217833 A1 | 7/2019 | Michalski et al. | |
| 2019/0217842 A1 | 7/2019 | Leinung et al. | |
| 2019/0337503 A1 | 11/2019 | Otremba | |
| 2019/0366992 A1 | 12/2019 | Kluftinger et al. | |
| 2020/0070795 A1 | 3/2020 | Van Thiel | |
| 2020/0079341 A1* | 3/2020 | Van Thiel | B60T 8/1708 |
| 2020/0139952 A1* | 5/2020 | Van Thiel | B60T 13/385 |
| 2020/0207319 A1* | 7/2020 | Van Thiel | B60T 13/385 |
| 2021/0078556 A1 | 3/2021 | Laine et al. | |
| 2021/0162972 A1 | 6/2021 | Schnittger et al. | |
| 2021/0245723 A1* | 8/2021 | Schnittger | B60T 13/683 |
| 2021/0261110 A1* | 8/2021 | Schnittger | B60T 13/266 |
| 2021/0269007 A1* | 9/2021 | Schnittger | B60T 13/265 |
| 2022/0144235 A1* | 5/2022 | Van Thiel | B60T 8/362 |
| 2022/0250602 A1* | 8/2022 | Schnittger | B60T 13/683 |
| 2022/0297655 A1* | 9/2022 | Dieckmann | B60T 13/683 |

FOREIGN PATENT DOCUMENTS

| | | |
|---|---|---|
| CN | 106660536 A | 5/2017 |
| DE | 100 42 215 C1 | 11/2001 |
| DE | 103 36 611 A1 | 3/2005 |
| DE | 10 2006 055 569 A1 | 5/2008 |
| DE | 10 2008 014 458 A1 | 9/2009 |
| DE | 10 2008 007 877 B3 | 11/2009 |
| DE | 10 2006 055 570 B4 | 5/2010 |
| DE | 10 2015 114 176 B3 | 7/2016 |
| DE | 10 2015 107 125 A1 | 11/2016 |
| DE | 10 2015 011 296 A1 | 3/2017 |
| DE | 10 2015 118 290 A1 | 4/2017 |
| DE | 10 2015 119 136 A1 | 5/2017 |
| DE | 10 2016 117 836 A1 | 3/2018 |
| DE | 10 2016 117 837 A1 | 3/2018 |
| DE | 10 2017 102 074 A1 | 8/2018 |
| DE | 10 2017 002 719 A1 | 9/2018 |
| DE | 10 2017 007 781 A1 | 2/2019 |
| DE | 10 2017 120 691 A1 | 3/2019 |
| EP | 1 953 054 A1 | 8/2008 |
| EP | 2 099 666 B1 | 6/2010 |
| EP | 2 146 882 B1 | 1/2014 |
| EP | 2 794 368 B1 | 11/2015 |
| JP | 2017-149263 A | 8/2017 |
| JP | 2021-529120 A | 10/2021 |
| WO | WO 2009/083108 A2 | 7/2009 |
| WO | WO 2015/154787 A1 | 10/2015 |
| WO | WO 2016/177475 A1 | 11/2016 |
| WO | WO 2017/055015 A1 | 4/2017 |
| WO | WO 2017/071991 A1 | 5/2017 |

OTHER PUBLICATIONS

International Preliminary Report on Patentability (PCT/IB/326 & PCT/IB/373) issued in PCT Application No. PCT/EP2020/069412 dated Jan. 18, 2022, including English translation of document C2 (German-language Written Opinion (PCT/ISA/237), filed on Jan. 11, 2022) (seven (7) pages).
International Search Report (PCT/ISA/210) issued in PCT Application No. PCT/EP2020/069412 dated Nov. 6, 2020 with English translation (four (4) pages).
German-language Written Opinion (PCT/ISA/237) issued in PCT Application No. PCT/EP2020/069412 dated Nov. 6, 2020 (five (5) pages).
German-language Office Action issued in German Application No. 10 2019 118 895.4 dated Apr. 3, 2020 (10 pages).
Japanese-language Office Action issued in Japanese Application No. 2022-501355 dated Apr. 4, 2023 with English translation (7 pages).
German-language Notice of Opposition issued in European Application No. 20739941.1 dated Jun. 18, 2024 (61 pages).

* cited by examiner

PARKING BRAKE DEVICE FOR A UTILITY VEHICLE

BACKGROUND AND SUMMARY OF THE INVENTION

The present invention relates to a parking brake device for a utility vehicle, having at least one first connector to a compressed air source and at least one second connector to a compressed air source.

Parking brake devices for utility vehicles are already known from the prior art. In the context of utility vehicles, pneumatic brake systems are used by way of which the spring brake cylinders of a utility vehicle or else the brake system of a trailer can be utilized.

Brake systems are already known from the prior art. DE 10 2015 107 125 A1 thus discloses a device for controlling a brake system for a utility vehicle, having a parking brake control valve for providing a parking brake function for the utility vehicle, and a trailer control valve for providing a holding brake function and a function of the electric braking for the trailer.

DE 10 2016 117 836 A1 discloses an air preparation unit for a brake system of a utility vehicle. The air preparation unit comprises a foot brake module connector for pneumatically coupling the air preparation unit to a foot brake module of the brake system, at least one valve unit for impinging the foot brake module connector, and a control pressure apparatus and a control apparatus for actuating the valve unit.

DE 10 2016 117 837 A1 relates to an air preparation unit for a brake system of a utility vehicle. The air preparation unit comprises a control valve connector for pneumatically coupling the air preparation unit to at least one control valve, which is disposed upstream of a wheel brake cylinder of the brake system, for varying a brake pressure in the wheel brake cylinder, an impingement valve for impinging the control valve connector with a nominal pressure, and a control apparatus for actuating the impingement valve.

DE 10 2017 102 074 A1 relates to an interface element for a vehicle that comprises electronic components, wherein the electronic components have at least one connector to at least one data interface of a utility vehicle, wherein the connector is suitable and configured for exchanging measured data and/or open-loop and/or closed-loop control data for controlling electronic components in a closed loop, wherein the electronic components furthermore have at least one integrated measuring and/or open-loop and/or closed-loop controlling unit.

WO 2016/177475 A1 relates to a device for controlling a brake system for a utility vehicle, and to a brake system.

EP 2 794 368 B1 relates to an electronically controlled pneumatic brake system for an automobile, and to an automobile having such a system.

Existing systems, or else new brake systems, for utility vehicles are to be retrofitted or refined, respectively, with a view to trucks which will be partially self-driving or self-driving in the future. Changes to the brake system are required for this.

It is the object of the present invention to advantageously refine a parking brake device of the type mentioned at the outset, in particular to such an extent that the possibility the requirements of partially self-driving or self-driving trucks can be met.

This object is achieved according to the invention by a parking brake device having at least one first connector line to a compressed air source, at least one second connector line to a compressed air source, at least one electronically actuatable bistable valve assembly for actuating a spring brake cylinder, and at least one further electronically actuatable redundancy control valve assembly for actuating a redundant brake system. At least one first control electronics module and at least one second control electronics module, which are able to be operated independently of one another, are provided. The bistable valve assembly is able to be actuated by means of the first control electronics module and, independently thereof, the redundancy control valve assembly is able to be actuated by means of the second control electronics module.

The invention is based on the fundamental concept that in a parking brake device, apart from a first bistable valve assembly that activates spring brake cylinders of the vehicle, in particular of a utility vehicle, an additional brake circuit which has a redundancy control valve assembly and provides a redundant braking possibility is also integrated. In order to be able to actuate the two brake systems independently of one another also in the event of a failure of the electronic system, a first control electronics module as well as a second control electronics module are provided. The first control electronics module here is able to be operated independently of the second control electronics module such that a redundancy is also provided on the electronics level.

The first and second control electronics module (preferably) have mutually separate current supplies so that a redundant power supply guarantees a further enhancement of the operational reliability.

It can furthermore be provided that the bistable valve assembly comprises at least one TCI control valve which is configured and specified in such a manner that at least one control line of a bistable valve of the bistable valve assembly is able to be controlled, wherein the control line is able to be connected to a compressed air source. The TCI control valve may be a solenoid valve. It is furthermore conceivable that the TCI control valve is a 2/2-way solenoid valve. The actuation of the control line can take place by correspondingly opening and closing, or releasing and closing, respectively, the line. In the closed state of the TCI control valve, this line, or this supply line, respectively, to the control line is shut down.

It can moreover be provided that the TCI control valve is able to be actuated by means of the first control electronics module.

It can moreover by provided that the bistable valve assembly comprises at least one TCO control valve which is configured and specified in such a manner that the control line of the bistable valve is able to be vented. The TCO control valve can likewise be a solenoid valve. The solenoid valve can be a 2/2-way solenoid valve.

The TCO control valve can be able to be actuated by means of the first control electronics module. Complete actuation of the bistable valve assembly in electronic and pneumatic terms is enabled in this way. It can in particular be provided that the compressed air source is used for the TCI control valve and the TCO control valve, and thus for the entire bistable valve assembly, wherein a compressed air source that is independent of the redundancy control valve assembly is in particular used here.

It can moreover be provided that the redundancy control valve assembly comprises at least one IV control valve which is configured and specified in such a manner that at least one control line of a redundancy control valve is able to be controlled. The IV control valve here can likewise be a solenoid valve. A 2/2-way solenoid valve can in particular be used. The pneumatic connector of the IV control valve can be connected to a second compressed air source or a compressed air source different from the first compressed air source. This is, however, not mandatory. It is conceivable that the same compressed air source is used, but there being different supply lines in this instance.

The IV control valve can be able to be actuated by means of the second control electronics module. An actuation that is redundant in electronic terms is enabled as a result.

It can furthermore be provided that the redundancy control valve assembly comprises at least one OV control valve which is configured and specified in such a manner that the control line of the redundancy control valve is able to be vented. The supply line of the redundancy control valve can be enabled as a result.

The redundancy control valve can be a relay valve. Simple pneumatic actuation of the redundancy control valve is enabled as a result. Accordingly, it becomes possible in this instance for the pneumatic actuation of the redundancy control valve to be implemented by way of the electronic actuation of the IV control valve and of the OV control valve.

The OV control valve can likewise be able to be actuated by means of the second control electronics module. As a result, it becomes possible for the entire redundancy control valve assembly to be actuated by means of the second control electronics module and thus independently of the first control electronics module. A failure of the first control electronics module thus does not affect the electronic actuation capability of the redundancy control valve assembly.

It can moreover be provided that the first connector line is connected, or able to be connected, to a first compressed air source, and the second connector line is connected, or able to be connected, to a second compressed air source different from the first compressed air source.

It is moreover possible that the TCI control valve and the TCO control valve are connected, or able to be connected, to the first connector line, and/or that the IV control valve and the OV control valve are connected, or able to be connected, to the second connector line.

It can moreover be provided that the TCI control valve and the TCO control valve and the IV control valve and the OV control valve are connected, or able to be connected, to the first connector line. This represents a possibility of being able to manage only with a single compressed air source. Provided in this case are dedicated pneumatic connectors, for example within the system limit of the parking brake device, so as to be able to provide dedicated pneumatic supply lines within the parking brake device for the TCI control valve and the TCO control valve, on the one hand, and the IV control valve and the OV control valve, on the other hand.

It can moreover be provided that the first connector line and the second connector line are connected to the same compressed air source.

It is moreover conceivable that the TCI control valve conjointly assumes the function of an IV control valve and serves for actuating the bistable valve as well as for actuating the redundancy control valve. In principle however, it is conceivable in this case that the TCI control valve and the IV control valve can be actuated by the first control electronics module as well as, independently thereof, by the second control electronics module. Redundancy at least in electronic terms is achieved as a result. Furthermore, a high functionality density associated with a reduced number of control valves used (the IV control valve can be dispensed with in particular) can be achieved by virtue of the TCI control valve being allocated two functions. As a result, the parking brake device is of a simpler overall construction, this additionally resulting in a safer and more cost-effective parking brake device.

It is moreover conceivable that the TCO control valve conjointly assumes the function of an OV control valve and serves for actuating the bistable valve as well as for actuating the redundancy control valve. In a manner analogous to the function of the TCI control valve that conjointly assumes the function of an IV control valve, it is conceivable in this context that the TCO control valve and the OV control valve can be actuated by the first control electronics module as well as, independently thereof, by the second control electronics module. Redundancy at least in electronic terms is achieved as a result. Moreover, a high functionality density associated with a reduced number of control valves used (the OV control valve can be dispensed with in particular) can be achieved by virtue of the TCO control valve being allocated two functions. As a result, the parking brake device is of a simpler overall construction, this additionally resulting in a safer and more cost-effective parking brake device.

Further details and advantages of the invention are now to be explained by means of the exemplary embodiments illustrated in more detail in the drawings.

DETAILED DESCRIPTION OF THE DRAWINGS

Figure 1:
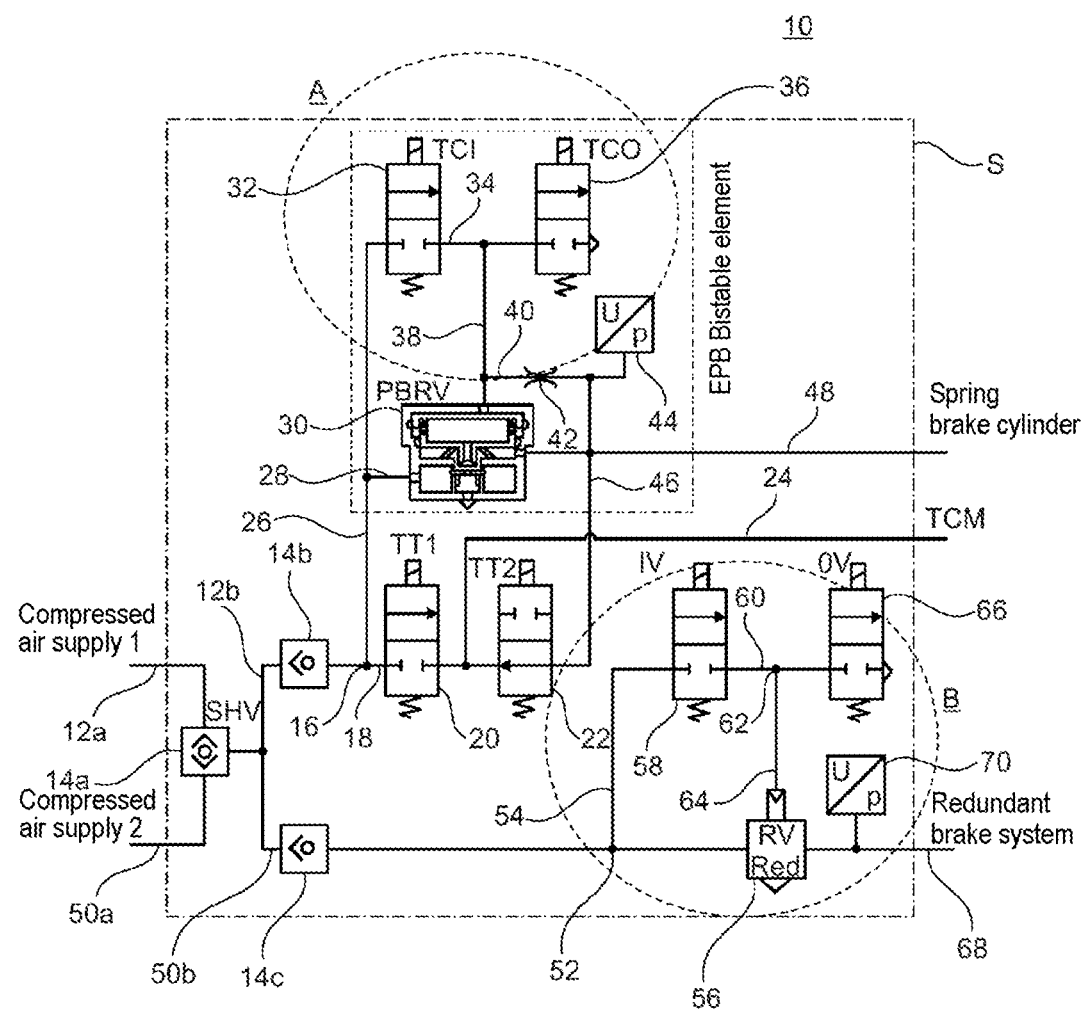
FIG. 1 shows a first exemplary embodiment of a parking brake device according to the invention.

FIG. 1 in a schematic illustration shows a first exemplary embodiment of a parking brake device 10 according to the invention.

The system limit S of the parking brake device 10 is identified by or plotted with, respectively, a dashed line.

The parking brake device 10 here has a first and a second compressed air supply, or connector line 12a, 50a, (supply 1, supply 2), respectively.

This first and/or second pressure supply line 12a, 50a are/is connected, or able to be connected, to a compressed air source such as, for example, a compressor.

Alternatively or additionally it can be provided that the first and/or second compressed air supply 12a, 50a are/is supplied by a corresponding connector for a parking brake device of a multi-circuit protection valve (not shown in FIG. 1).

The first and second connector line 12a, 50a by way of a switch valve 14a initially converge so as to form a common connector line for supplying the parking brake device 10 with compressed air.

The switch valve 14a is designed as a so-called select-high valve 14a.

The common connector line downstream of the switch valve 14a branches again so as to form the first and second connector line 12b, 50b.

A first stop valve 14b is disposed in the first connector line 12b, and a second stop valve 14c is disposed in the second connector line 50b.

A branching point 16 from which a first line 18 and a second line 26 branch off is provided downstream of the stop valve 14b.

A first control valve 20 for actuating the trailer control module (TCM) not illustrated in more detail is provided downstream of the line 18.

A line 24 which leads to the trailer control module (TCM) branches off downstream of the control valve 20.

An additional control valve 22 which can block or permit the passage of compressed air emanating from the line 46 is furthermore provided after the branching point of the line 24.

After a nodal point, the line 26 by way of the line 28 leads to the bistable valve 30.

The bistable valve 30 serves for actuating the spring brake cylinders of a tractive unit. The spring brake cylinders are actuated by way of the output line 48.

Two control valves 32, 36 are provided for the actuation of the bistable valve 30.

The first control valve 32 (TCI) serves for being able to correspondingly block the pressure 32 prevailing in the line 26, so as to be able to then supply said pressure 32 in a corresponding manner by way of the control lines 34 and 38 to the pneumatic control input of the bistable valve 30.

The control lines 34 and 38 can be correspondingly vented by way of the control valve 36.

A further line 40, which is connected to the output line 48 and in which a throttle 42 and a pressure sensor 44 are provided, branches off from the line 38. The line 40 is connected to the line 48 such that the trailer control module (TCM) and with the participation of the control valve 22 can also be actuated by way of this line.

Moreover provided is also a further redundant brake system.

A second compressed air supply line 50a (supply 2) is provided for the redundant brake system. The line 50a can be connected to the same compressed air source or to another compressed air source.

Downstream of the stop valve 14c, the line 50a, 50b leads to a nodal point 52 where a line 54 which serves for pneumatically actuating the redundant relay valve 56 branches from the supply line for the redundant relay valve 56.

The line 54 likewise leads to a control valve assembly 58, 66 as has already been described above in the context of the bistable valve 30. Here too, two solenoid valves 58, 66 which serve as control valves for the redundant relay valve 56 are provided.

Like the control valves 32 (TCI) and 36 (TCO), the valves 58 and 66 are embodied as 2/2-way solenoid valves. These control valves can be electronically or electrically actuated, respectively.

The control valve 58 can block the control line 54 and thus the compressed air supply to the control input of the relay valve 56. The line 60 and 64 can be correspondingly vented by way of the valve 66.

The line 64 as well as the corresponding supply line to the solenoid valve 66 branch off at the nodal point 62.

The connecting line to the redundant brake system 68 is provided downstream and at the output side of the relay valve 56. A pressure sensor 70 is provided in this line.

The pneumatic circuit diagram of the control valves 58, 66 of the redundancy relay valve 56 as well as of the pressure sensor 70 configures a functional and structural component group which is configured as a so-called electropneumatic modulator for regulating a redundancy brake pressure at the connecting line for the redundant brake system 68.

The redundant brake system 68 is in particular connected to a service brake device of a utility vehicle and provided for controlling said service brake device.

Furthermore provided are a first control electronics module A and at least one second control electronics module B.

The function of the first exemplary embodiment of the parking brake device 10 according to FIG. 1 here is as follows:

For reasons of simplification, the function of the parking brake device 10 is first explained under intended operating conditions, i.e. without taking into account the electropneumatic modulator.

The control input of the relay valve 30 of the tractive unit can be supplied with air or vented by means of the two solenoid control valves 32 and 36, depending on the desired parking state, this resulting in the spring brake cylinders of the tractive vehicle being activated or released by way of the output line 48.

The control electronics module A is provided and specified for the electronic actuation of the bistable valve assembly having the TCI valve 32 and the TCO valve 36 (for actuating the bistable valve or relay valve 30, respectively).

The actuation of the control valves 32, 36 by way of the control electronics module A takes place independently of the control electronics module B so that these control valves 32, 36 continue to be actuatable even in the event of a failure of the control electronics module B.

Furthermore, an additional feedback connection between the control input and the output of the relay valve 30 can be provided by way of the branch line 40, in which the throttle 42 is disposed, in that the pressure at the output of the relay valve 30 is able to be fed back to the control input of the relay valve.

By means of the combination of the branch line 40 and the throttle 42 provided therein, a loss of air in the course of a switching procedure between different operating modes of the parking brake device 10 according to the invention is in particular able to be minimized.

A switching procedure between the operating states can thus take place in a more rapid, efficient and precise manner.

As a result of precluding any loss of air, no readjustment in terms of compressed air is required in particular.

According to the switch positions of the control valves 20, 22 as shown in FIG. 1, the output line 24 to the trailer control module is at all times actuated by way of the output line 48 of the tractive unit relay valve 30 and by way of the branch line 46.

The actuation of the trailer control module TCM (not shown in FIG. 1) according to FIG. 1 thus takes place in the same manner as the actuation of the spring brake cylinders of the tractive unit.

The control valves 20, 22 furthermore serve for setting a so-called trailer test state.

The latter is initiated by switching the control valves 20, 22 to the respective switch position not illustrated in FIG. 1 so that the spring brake cylinders of the tractive unit are activated (by correspondingly actuating the control valves 32, 36) and the spring brake cylinders and/or the service brakes of the trailer are not activated.

The functional description hereunder relates to a defect in the parking brake device 10 and/or in an electropneumatic service brake device (not shown in FIG. 1) of a utility vehicle.

In this case, or in these cases, respectively, the parking brake device 10 is specified in such a manner that two redundant fallback planes are provided which become effective in this case, or in these cases, respectively.

The first fallback plane is configured in such a manner that in the event of a defect or a (partial) failure of the electronic actuation of a service brake device the latter can nevertheless be actuated by way of the electropneumatic modulator, and in particular by way of the redundancy relay valve 56.

In this case, even the control electronics module A could additionally fail without however there being any effect on the actuation of the electropneumatic modulator, because the latter is actuated by the independent control electronics module B.

Consequently, according to the first fallback plane, the control electronics module B is provided and specified for the electronic actuation of the redundancy control valve assembly, or of the electropneumatic modulator, respectively, by way of the IV valve 58, the OV valve 66 (for actuating the redundancy relay valve 56).

The actuation of the electropneumatic modulator takes place in such a manner that the service brakes of each axle of the utility vehicle, in particular of the entire tractive unit, can continue to be actuated.

The second fallback plane in terms of construction is configured so as to be based on the first fallback plane.

Said second fallback plane is configured in such a manner that in the event of an additional defect, or of a (partial) failure, respectively, of the electropneumatic modulator the still intact and independent control electronics module A actuates the two control valves 32, 26 of the tractive unit relay valve 30 in such a manner that the spring brake cylinders of the utility vehicle can still be braked in steps.

These two fallback planes become effective or advantageous, respectively, in particular when the electronic actuation of the service brake device of the utility vehicle takes place autonomously, i.e. without the intervention of a driver.

Figure 2:
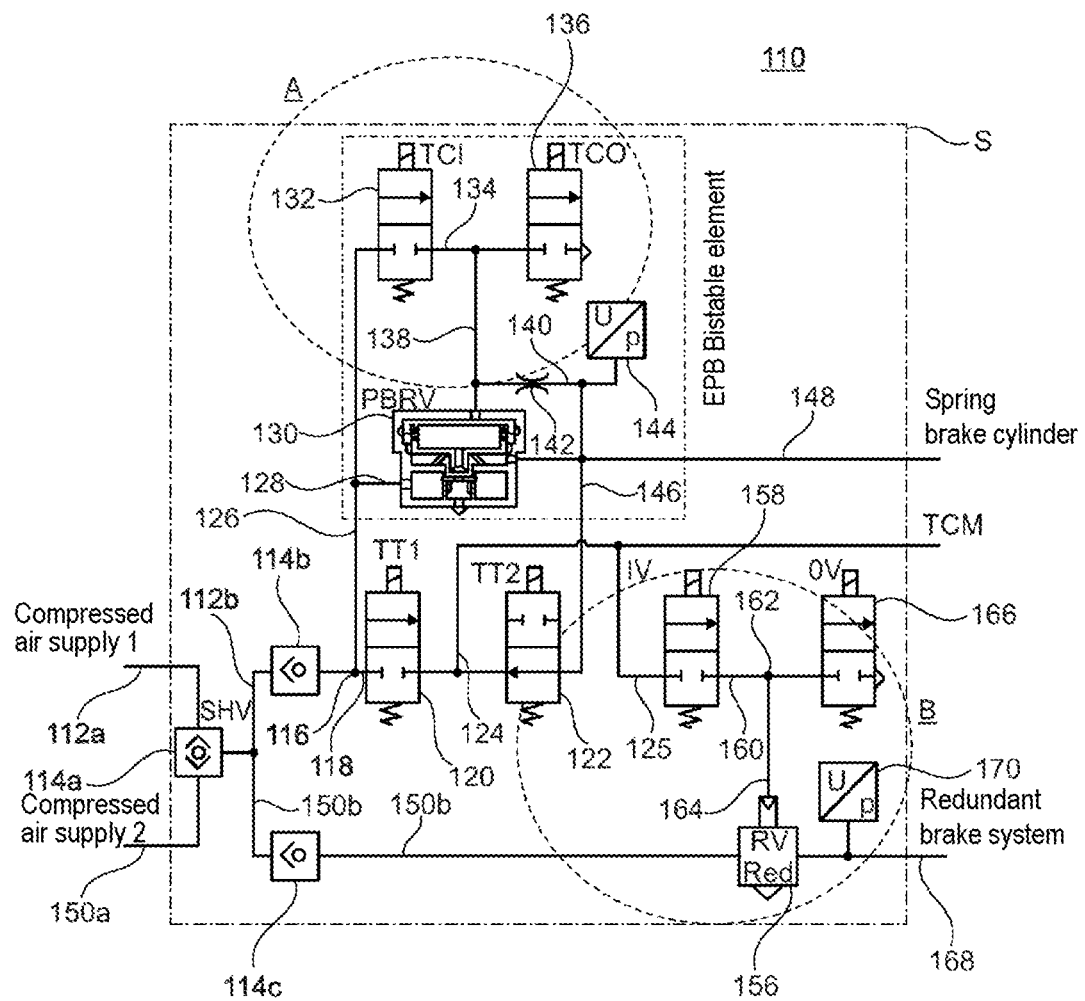
FIG. 2 shows a second exemplary embodiment of a parking brake device according to the invention.

FIG. 2 shows a second exemplary embodiment of a parking brake device 110 according to the invention.

The parking brake device 110 according to FIG. 2 here is constructed substantially identically to the exemplary embodiment of a parking brake device 10 shown in FIG. 1.

This applies to all structural as well as functional features. Equivalent features or elements are provided with the same reference sign but increased by the value 100.

There are however the following differences in structural and/or functional terms:

The IV control valve 158 in the exemplary embodiment shown here is connected to the lines 112a, 150b by way of the line 124 and the line 125.

This type of the connection of the IV control valve 158 enables this control valve to be supplied independently of the supply line 150b because the supply takes place by way of the output line 124 for the trailer control module TCM.

In terms of the first and second fallback plane however, the second exemplary embodiment of the parking brake device 110 does not differ from the first exemplary embodiment such that reference in this context is made to the first exemplary embodiment.

Figure 3:
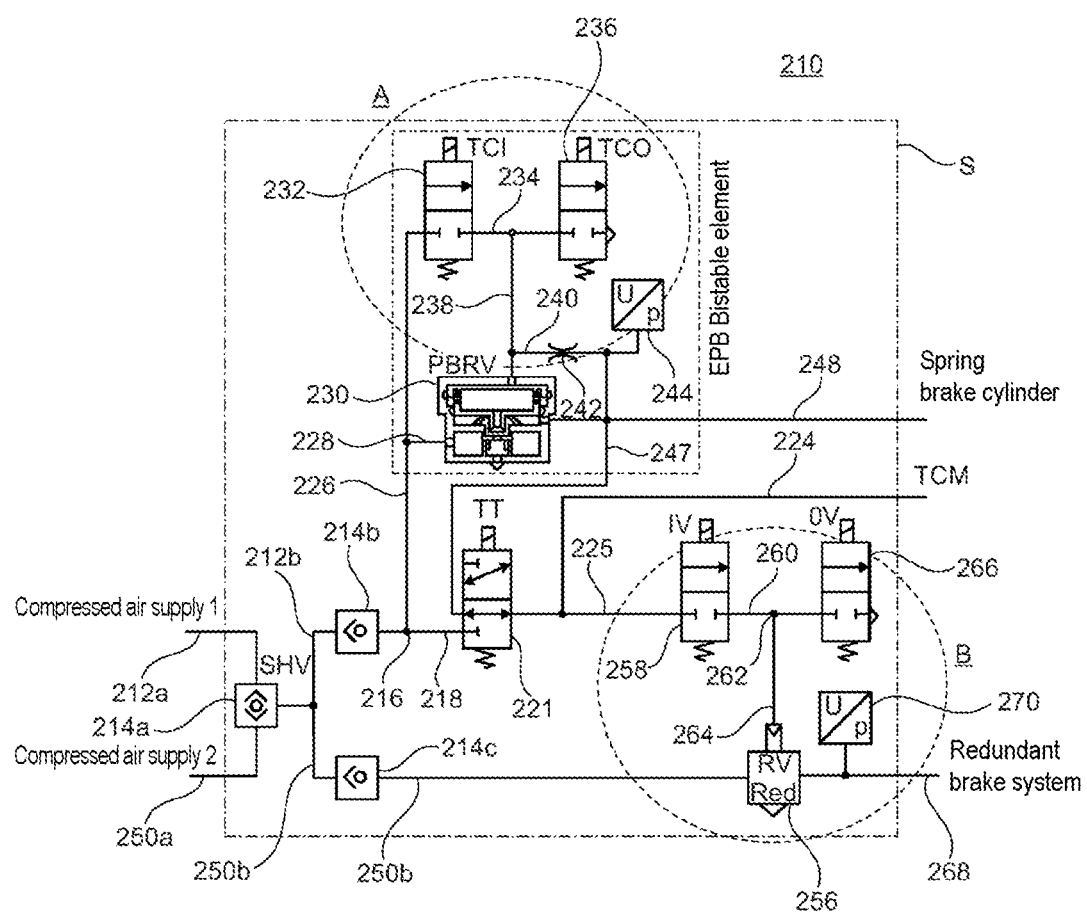
FIG. 3 shows a third exemplary embodiment of a parking brake device according to the invention.

FIG. 3 shows a third exemplary embodiment of a parking brake device 210 according to the invention.

The parking brake device 210 according to FIG. 3 here is constructed substantially identically to the second exemplary embodiment of a parking brake device 110 shown in FIG. 2.

This applies to all structural as well as functional features. Equivalent features or elements are provided with the same reference sign but increased by the value 100.

There are however the following differences in structural and/or functional terms:

In contrast to the second exemplary embodiment according to FIG. 2, a 3/2-way TT valve 221, which replaces the two control valves 120, 122 from FIG. 2, or unifies said control valves 120, 122 so as to form one control valve 221, respectively, is provided here however subsequently in the line 218.

In comparison to the second exemplary embodiment, one control valve can thus be saved while maintaining the same function, this leading to the third exemplary embodiment of the parking brake device 210 according to the invention being simpler and more cost-effective in terms of construction.

In terms of function however, the third exemplary embodiment corresponds to the parking brake device 210 according to the invention of the second exemplary embodiment 110 from FIG. 2.

In terms of the first and second fallback plane, the third exemplary embodiment of the parking brake device 210 does not differ from the second exemplary embodiment such that reference in this context is made to the second exemplary embodiment.

Figure 4:
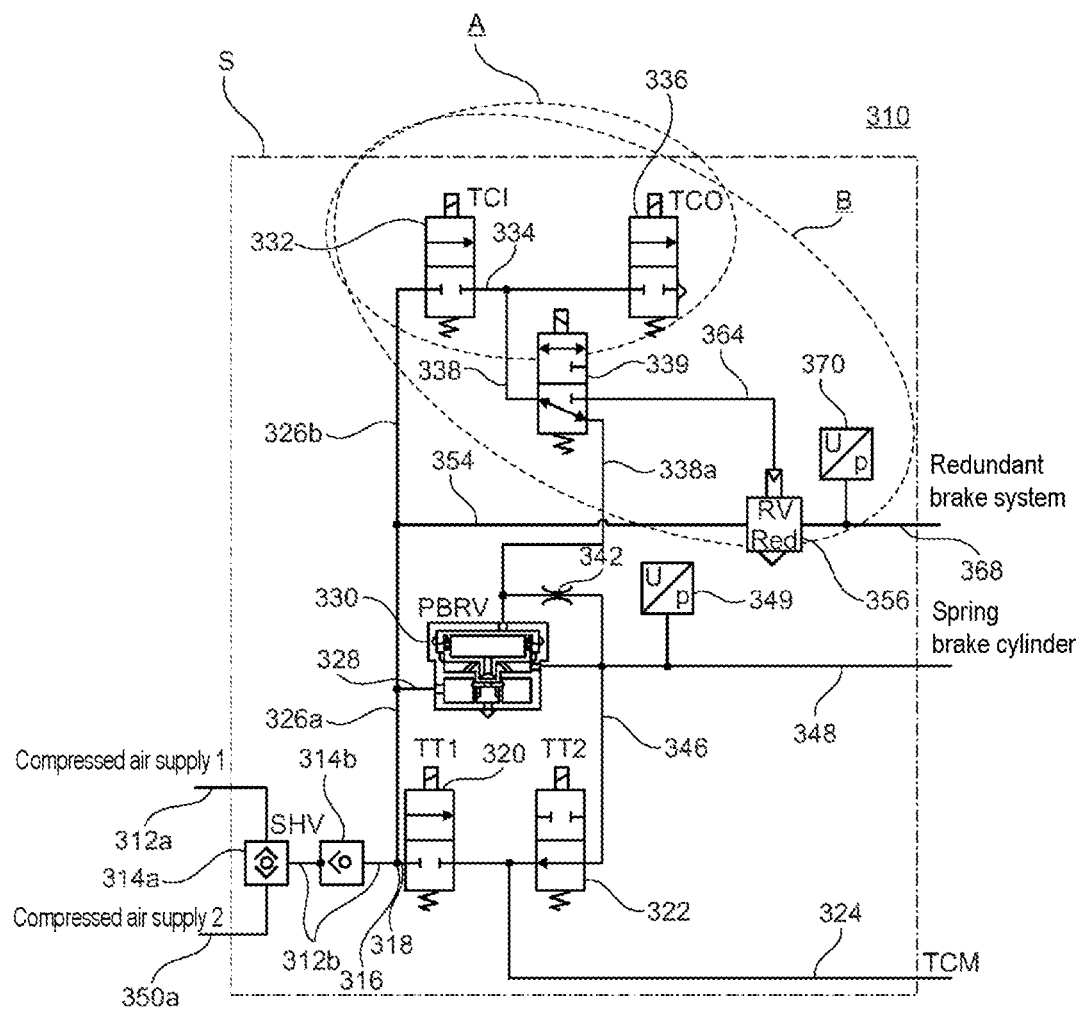
FIG. 4 shows a fourth exemplary embodiment of a parking brake device according to the invention.

FIG. 4 shows a fourth exemplary embodiment of a parking brake device 310 according to the invention.

The parking brake device 310 according to FIG. 4 here is constructed substantially identically to the exemplary embodiment of a parking brake device 10 shown in FIG. 1.

This applies to all structural as well as functional features. Equivalent features or elements are provided with the same reference sign but increased by the value 300.

There are however the following differences in structural and/or functional terms:

The electropneumatic modulator is not supplied by the second connector line 50a or 50b, respectively, as in FIG. 1, but by a dedicated supply line 354 which branches off between the tractive unit relay valve 330 and the control valve 332.

This further supply line branches off from the common control line 326b, the latter per se serving for the tractive unit relay valve 330 and for the redundancy relay valve 356.

Accordingly, the portion of the second supply line 50b including the stop valve 14c from the first exemplary embodiment can be dispensed with in the fourth exemplary embodiment.

In the exemplary embodiment according to FIG. 4, the function of the IV valve and of the OV valve of the electropneumatic modulator is conjointly assumed by the TCI valve 332 and the TCO valve 336.

A 3/2-way valve 339, by means of which, as a function of the switch position, the control line 338a of the bistable valve, or of the relay valve 330, respectively, can be supplied with control pressure, or the control line 364 of the redundancy relay valve 356 can be supplied with pressure, is provided downstream of the TCI valve 332 and subsequently onto the line 338.

Alternatively, and in the case of a switch position of the 3/2-way valve 339 not correspondingly illustrated in FIG. 4, the redundancy relay valve 356 can be supplied with pressure by way of the line 364 and thus the redundancy relay valve 356 can be released.

The first control electronics module A as well as the second control electronics module B are capable of actuating the TCI valve 332 and the TCO valve 336 in a mutually independent manner.

The 3/2-way valve 339 is likewise actuated by the first control electronics module A as well as by the second control electronics module B. The pressure sensor 370 is evaluated only by the second control electronics module B.

The functionality of the fourth exemplary embodiment of the parking brake device 310, as a function of the two switch positions of the 3/2-way solenoid valve 339, corresponds substantially to the functionality of the first exemplary embodiment from FIG. 1.

In terms of the first fallback plane, the control electronics module B is configured in such a manner that the latter in the event of a defect or a (partial) failure of the electronic actuation of a service brake device can nevertheless actuate the latter by way of the electropneumatic modulator.

To this end, the control electronics module B however first has to switch the 3/2-way valve 339 such that the latter by means of the two control valves 332, 336 can actuate the redundancy relay valve 356.

The actuation of the electropneumatic modulator takes place in such a manner that the service brakes of each axle of the utility vehicle, in particular of the tractive unit, can continue to be actuated.

The second fallback plane, in terms of construction, is configured so as to be based on the first fallback plane.

Said second fallback plane is configured in such a manner that in the event of an additional defect, or of a (partial) failure, respectively, of the control electronics module B of the electropneumatic modulator the still intact and independent control electronics module A controls the 3/2-way valve 339 back to the switch position illustrated according to FIG. 4.

Consequently, the two control valves 332, 326 of the tractive unit relay valve 330 can now be actuated in such a manner that the spring brake cylinders of the entire utility vehicle can still be braked in steps.

These two fallback planes become particularly effective or advantageous, respectively, when the electronic actuation of the service brake device of the utility vehicle takes place autonomously, i.e. without the intervention of a driver.

Figure 5A:
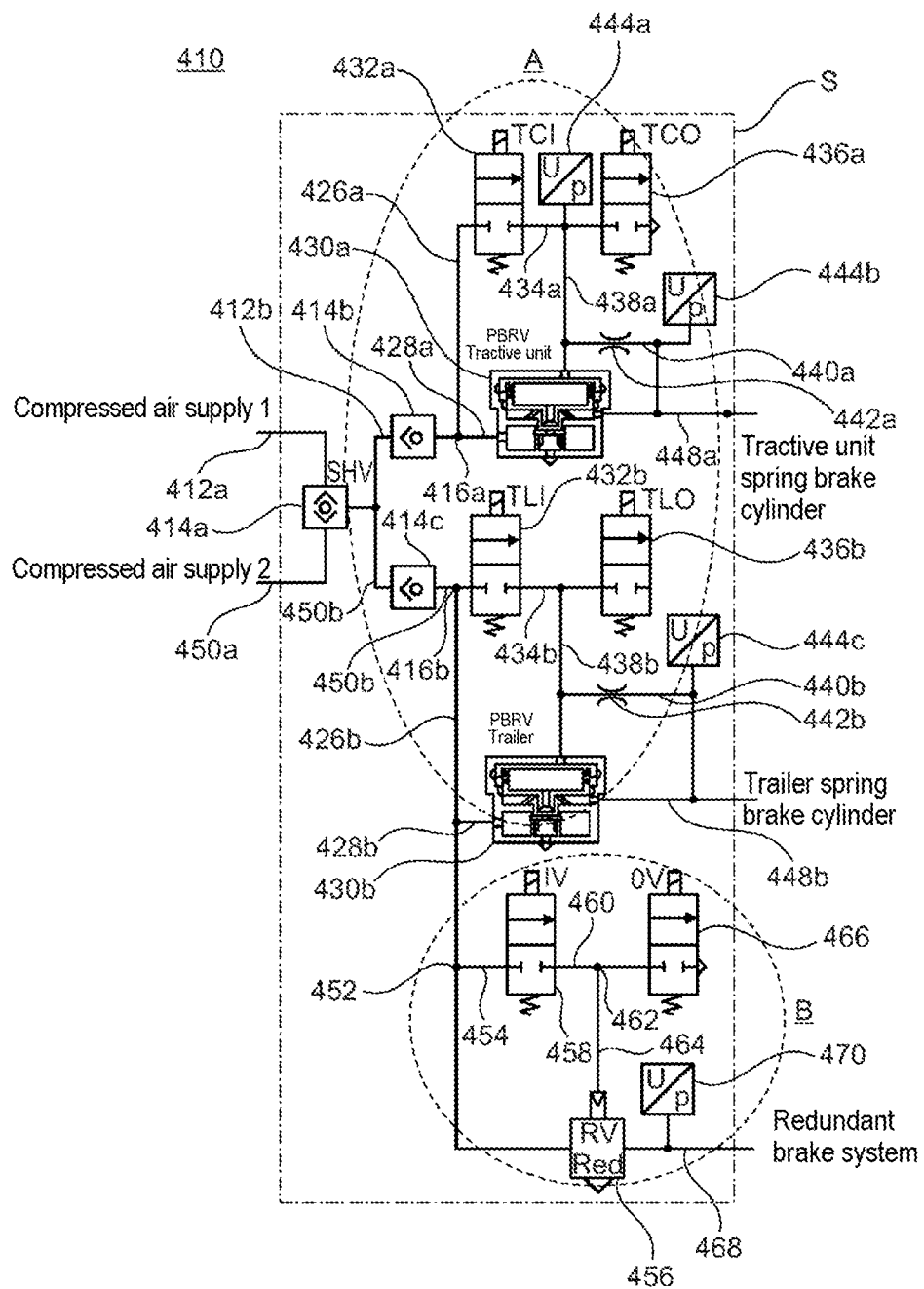
FIG. 5a shows a fifth exemplary embodiment of a parking brake device according to the invention.

FIG. 5a shows a fifth exemplary embodiment of a parking brake device 410 according to the invention.

The system limit S of the parking brake device 410 is plotted with a dashed line.

The parking brake device 410 has a first compressed air supply 412a, or connector line 412a, respectively, and a second compressed air supply or connector line 450a, 450b, respectively.

The first and/or second compressed air supply 412a, 450a can be disposed on a compressor, for example.

Alternatively or additionally, it can be provided that the first and/or second compressed air supply 412a, 450a are/is supplied by a corresponding connector for a parking brake device of a multi-circuit protection valve (not shown in FIG. 5a).

The first and second connector line 412a, 450a by way of a switch valve 414a initially converge so as to form a common connector line for supplying the parking brake device 410 with compressed air.

The switch valve 414a is designed as a so-called select-high valve 414a.

The common connector line downstream of the switch valve 414a branches again so as to form the first and second connector line 412b, 450b.

A first stop valve 414b is disposed in the first connector line 412b, and a second stop valve 414c is disposed in the second connector line 450b.

A first branching point 416a from which the line 428a to the first bistable valve 430a branches off is provided downstream of the first stop valve 414b such that the first bistable valve 430a is supplied with compressed air from the first connector line 412a, 412b.

The first bistable valve assembly according to the fifth exemplary embodiment, having the first bistable valve or relay valve 430a, respectively, including the associated control valves 432a, 436a (TCI, TCO), is constructed substantially identically to the corresponding exemplary embodiment of a bistable valve assembly shown in FIG. 1.

This applies to all structural as well as functional features. Equivalent features or elements are provided with the same reference sign but increased by the value 400a.

The first relay valve 430a is connected to the spring brake cylinders of a tractive unit of a utility vehicle.

In addition to the first bistable valve assembly which is supplied by the first connector line 412a, 412b, or is connected to the latter, respectively, the fifth exemplary embodiment has a second bistable valve assembly which is supplied by the second connector line 450a, 450b, or is connected to the latter, respectively.

The second bistable valve assembly, having the second bistable valve or relay valve 430b, respectively, including the associated control valves 432b, 436b (TLI, TLO), is constructed substantially identically to the first bistable valve assembly according to the fifth exemplary embodiment.

This applies to all structural as well as functional features. Equivalent features or elements are provided with the same reference sign but varied by the suffix b (cf. correspondingly FIG. 5a).

The second relay valve 430b is connected to the spring brake cylinders of a trailer of a utility vehicle.

Moreover, a further supply line which supplies an electropneumatic modulator with compressed air branches off at the nodal point of the supply lines 426b, 428b.

This electropneumatic modulator according to the fifth exemplary embodiment, having the redundancy bistable valve or redundancy relay valve 456, respectively, including the associated control valves 458, 466 (IV, OV), is constructed substantially identically to the first exemplary embodiment of an electropneumatic modulator shown in FIG. 1.

This applies to all structural as well as functional features. Equivalent features or elements are provided with the same reference sign but increased by the value 400.

The function of the fifth exemplary embodiment of the parking brake device 410 according to FIG. 5a, in terms of the first and second fallback plane (as has already been explained in principle in FIGS. 1 to 4), is as follows:

The actuation of the respective control valve pairs, or control valve assemblies 432a, 436a; 432b, 436b, respectively, for the first and second relay valve 430a, 430b takes place by way of a control electronics module A.

Accordingly, the actuation of the control valves 458, 466 for the redundancy relay valve 456 takes place by way of the control electronics module B which operates independently of the control electronics module A and moreover has a dedicated current supply.

The first fallback plane is configured in such a manner that in the event of a defect or a (partial) failure of the electronic actuation of a service brake device (not shown in FIG. 5a) the latter can nevertheless be actuated by way of the electropneumatic modulator.

In this case, even the control electronics module A could additionally fail without however there being any effect on the actuation of the electropneumatic modulator, because the latter is actuated by the independent control electronics module B.

Consequently, according to the first fallback plane, the control electronics module B is provided and specified in an independent or redundant manner for the electronic actuation of the redundancy control valve assembly by way of the IV valve 458, the OV valve 466 (for actuating the redundancy relay valve 456).

The actuation of the control valves 458, 466 takes place in such a manner that the service brakes of each axle of the utility vehicle, in particular of the tractive unit, can continue to be actuated by way of the redundancy relay valve 456.

The second fallback plane, in terms of construction, is configured so as to be based on the first fallback plane.

Said second fallback plane is configured in such a manner that in the event of an additional defect, or of a (partial) failure, respectively, of the electropneumatic modulator, or of the control electronics module B, respectively, the still intact and independent control electronics module A remains capable of being controlled.

Accordingly, the control electronics module A actuates the two control valve pairs 432a, 436a; 432b, 436b of the tractive unit relay valve 430a, or of the trailer relay valve 430b, respectively, in such a manner that the spring brake cylinders of the utility vehicle and of the trailer can still be braked in steps.

These two fallback planes become effective or advantageous, respectively, in particular when the electronic actuation of the service brake device of the utility vehicle takes place autonomously, i.e. without the intervention of a driver.

Figure 5B:
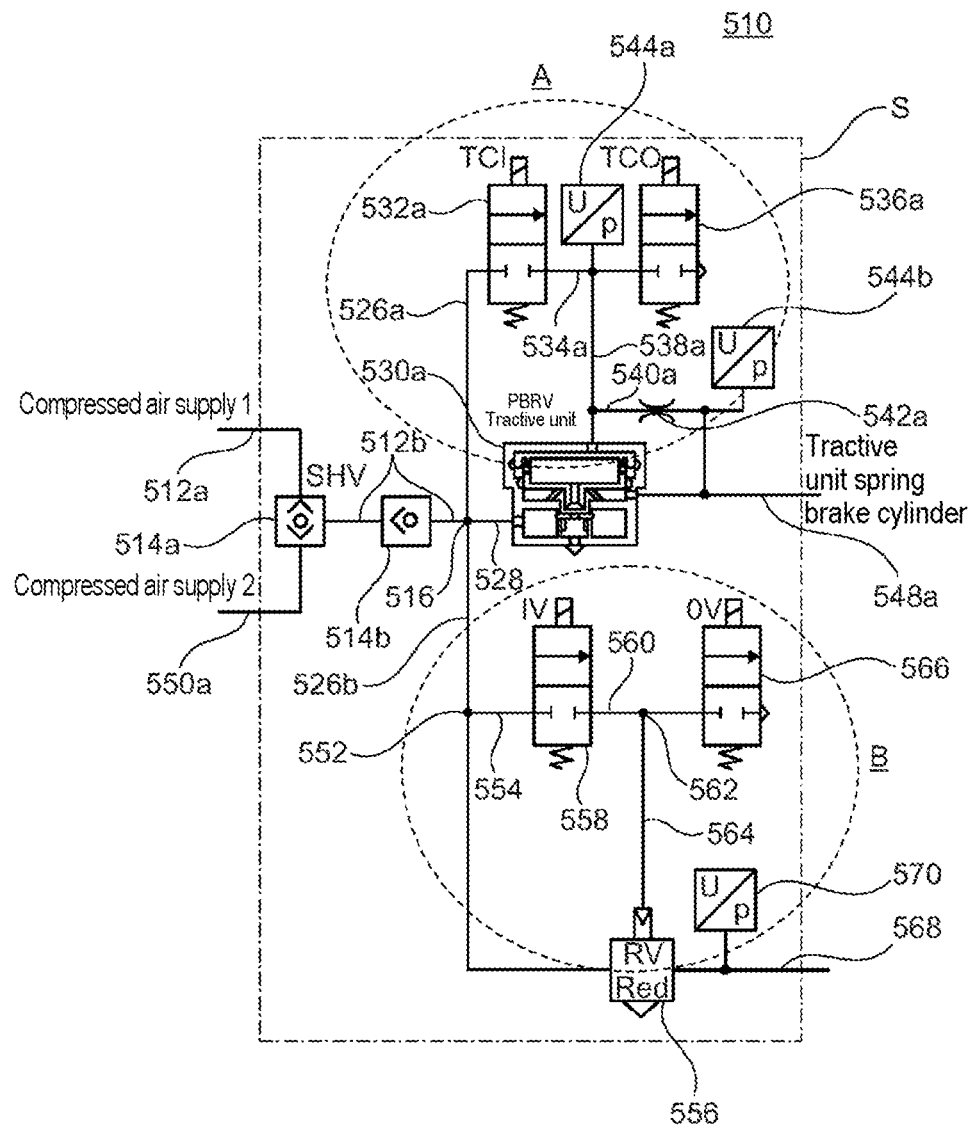
FIG. 5b shows a sixth exemplary embodiment of a parking brake device according to the invention.

FIG. 5b shows a sixth exemplary embodiment of a parking brake device 510 according to the invention.

The parking brake device 510 here is constructed substantially identically to the fifth exemplary embodiment shown in FIG. 5a.

Equivalent features or elements here are in each case provided with the same reference sign which is however increased by the value 100.

There are however the following differences in structural and/or functional terms:

The portion of the second supply line 450b, including the stop valve 414c, according to FIG. 5a is not present in the sixth exemplary embodiment such that the relay valve assembly for the tractive unit and the redundancy relay valve assembly downstream of the select-high valve 514a are supplied only by a single connector line 512b, 550a.

Furthermore absent in the sixth exemplary embodiment is the relay valve 430b for the trailer, as well as the associated control valves 432b, 436b and the feedback line to the control input thereof, as well as the pressure sensor 444c, or the throttle 442b, respectively, disposed in said feedback line, in each case according to the fifth exemplary embodiment.

Furthermore, the sixth exemplary embodiment has only one stop valve 514b for safeguarding the output line 548 of the tractive unit relay valve 530 and the redundancy output line 568.

The sixth exemplary embodiment of a parking brake device 510 shown in FIG. 5b is a so-called "rigid" embodiment which consequently does not provide any relay valve for a trailer.

The control electronics module A thus serves only for independently actuating the control valves 532a, 536a for the relay valve 530a of the tractive unit.

Accordingly, the control electronics module B serves for independently actuating the control valves 558, 566 for the redundancy relay valve 556.

The functionality of the sixth exemplary embodiment of the parking brake device 510, in particular in terms of the control electronics modules A and B, in terms of the tractive unit and of the redundant brake system consequently corresponds to the corresponding functionality of the fifth exemplary embodiment from FIG. 5a for these component groups.

Figure 6:
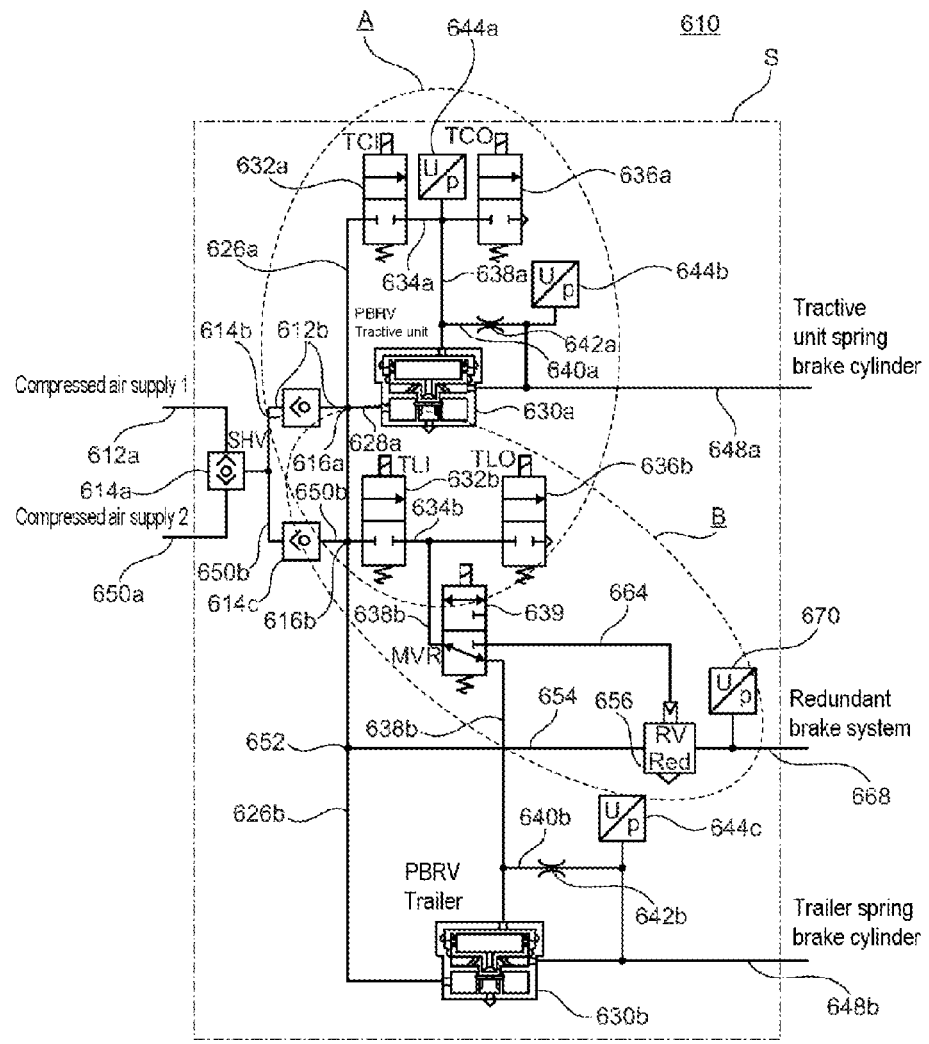
FIG. 6 shows a seventh exemplary embodiment of a parking brake device according to the invention.

FIG. 6 shows a seventh exemplary embodiment of a parking brake device 610 according to the invention.

The parking brake device 610 according to FIG. 6 substantially has the same structural and functional features as the fifth exemplary embodiment of a parking brake device 410 shown in FIG. 5a.

Identical or similar features or elements are provided with the same reference sign which is in each case however increased by the value 200.

There are however the following differences in structural and/or functional terms:

The same control valves 632b and 636b which are also used for actuating the relay valve or bistable valve 630b, respectively, for the trailer are now used for actuating the redundancy relay valve 656. To this end, a further 3/2-way valve 639 is provided in the branch line 638b downstream of the control valve 632b.

The 3/2-way control valve 639 (MVR) thus serves for actuating the relay valve 630b by way of the control line 638b as well as for actuating the redundancy relay valve 656 by way of the control line 664.

This embodiment has the advantage that the valves TLI TLO 632b, 636b are able to be used for two purposes. As a result, overall a simpler construction and the saving in terms of an IV or OV solenoid control valve 458, 466, respectively can be achieved (see FIG. 5a).

The control electronics module A thus serves for independently actuating the control valves 632a, 636a for the relay valve 630a of the tractive unit as well as for actuating the control valves 632b, 636b and the 3/2-way control valve 639.

Accordingly, the control electronics module B likewise serves for independently actuating the control valves 632b, 636b and the 3/2-way control valve 639.

The control valves 632b, 636b as well as the 3/2-way control valve 639, by virtue of the double actuation functionality thereof for the trailer relay valve 630b or the redundancy relay valve 656, must be able to be independently actuated by the control electronics module A as well as by the control electronics module B.

In terms of the first fallback plane, the control electronics module B is configured in such a manner that the latter in the event of a defect or a (partial) failure of the electronic actuation of the service brake device can nevertheless actuate the latter by way of the electropneumatic modulator and in particular by way of the redundancy relay valve 656.

In this case however, the control electronics module B first has to switch the 3/2-way valve 639 such that the latter, by means of the two control valves 632b, 636b, can actuate the redundancy relay valve 656.

The actuation of the electropneumatic modulator takes place in such a manner that the service brakes of each axle of the utility vehicle, in particular of the tractive unit, can continue to be actuated.

The second fallback plane, in terms of construction, is configured so as to be based on the first fallback plane.

Said second fallback plane is configured in such a manner that in the event of an additional defect, or of a (partial) failure, respectively, of the control electronics module B of the electropneumatic modulator the still intact and independent control electronics module A first controls or moves, respectively, the 3/2-way valve 639 back to the switch position illustrated according to FIG. 6.

Consequently, the two control valve pairs 632a, 636a, or 632b, 636b, respectively, of the tractive unit relay valve 630a, or of the trailer relay valve 630b, respectively, can now be actuated in such a manner that the spring brake cylinders of the utility vehicle and of the trailer can still be braked in steps.

These two fallback planes become effective or advantageous, respectively, in particular when the electronic actuation of the service brake device of the utility vehicle takes place autonomously, i.e. without the intervention of a driver.

Figure 7A:
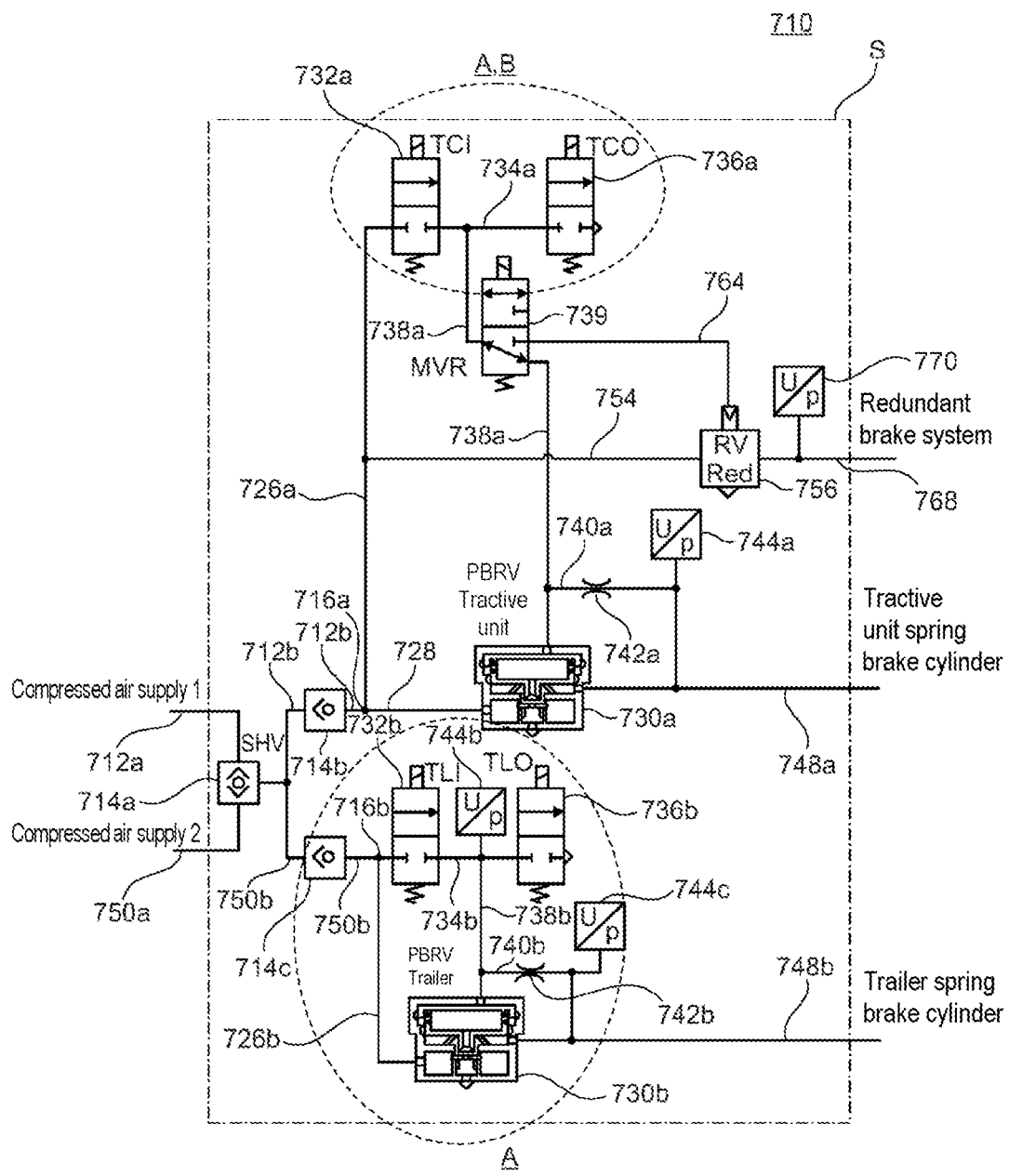
FIG. 7a shows an eighth exemplary embodiment of a parking brake device according to the invention.

FIG. 7a shows an eighth exemplary embodiment of a parking brake device 710 according to the invention.

The eighth exemplary embodiment substantially has the same structural and functional features as the fifth exemplary embodiment of the parking brake device 410 shown in FIG. 5a.

Equivalent elements or features are provided with the same reference sign but increased by the value 300.

In this exemplary embodiment however, the actuation of the redundancy relay valve 756 is implemented by means of the control valves 732a and 736a which also serve for actuating the relay valve 730a of the tractive unit.

In a manner comparable to the solution according to FIG. 6, a 3/2-way valve (MVR) 739 is likewise interposed in the control line 738a in this case between the control valves 732a and 736a, the latter being in each case 2/2-way solenoid valves.

This 3/2-way solenoid valve (MVR) 739 can be used for actuating the bistable valve 730a for the tractive unit as well as for the redundancy relay valve 756.

In contrast to FIG. 6 however, the interposing of the 3/2-way valve 739 here takes place between the control valves 732a and 736a that actuate the relay valve 730a for the tractive unit, and not (as in FIG. 6) between the control valves 632b, 636b for actuating the trailer, wherein the functionality is nevertheless comparable to FIG. 6.

The design embodiment and actuation of the relay valve assembly for the trailer, including the relay valve 730b and control valves 732b, 736b, is identical as in the fifth exemplary embodiment according to FIG. 5a, wherein a pressure sensor 744b is additionally provided between the control valves 732b, 736b.

The control valves 732a, 736a as well as the 3/2-way control valve 739, by virtue of the double actuation functionality thereof for the tractive unit relay valve 730a or the redundancy relay valve 756, must be able to be independently actuated by the control electronics module A as well as by the control electronics module B.

The control valves 732b, 736b for the trailer relay valve 730b are actuated in an independent manner only by the control electronics module A.

In terms of the first fallback plane, the control electronics module B is configured in such a manner that the latter in the event of a defect or a (partial) failure of the electronic actuation of the service brake device can nevertheless actuate the latter by way of the electropneumatic modulator and in particular by way of the redundancy relay valve 756.

In this case however, the control electronics module B must switch the 3/2-way valve 739 such that the latter by means of the two control valves 732a, 736a can actuate the redundancy relay valve 756.

The actuation of the redundancy relay valve 756 then takes place in such a manner that the service brakes of each axle of the utility vehicle, in particular of the tractive unit, can continue to be actuated.

The second fallback plane, in terms of construction, is configured so as to be based on the first fallback plane.

Said second fallback plane is configured in such a manner that in the event of an additional defect, or of a (partial) failure, respectively, of the control electronics module B of the electropneumatic modulator the still intact and independent control electronics module A first controls or moves, respectively, the 3/2-way valve 739 back to the switch position illustrated according to FIG. 7a.

Consequently, the two control valve pairs 732a, 736a, or 732b, 736b, respectively, of the tractive unit relay valve 730a, or of the trailer relay valve 730b, respectively, can now be actuated by the control electronics module A in such a manner that the spring brake cylinders of the tractive unit and of the trailer can still be braked in steps.

These two fallback planes become effective or advantageous, respectively, in particular when the electronic actuation of the service brake device of the utility vehicle takes place autonomously, i.e. without the intervention of a driver.

Figure 7B:
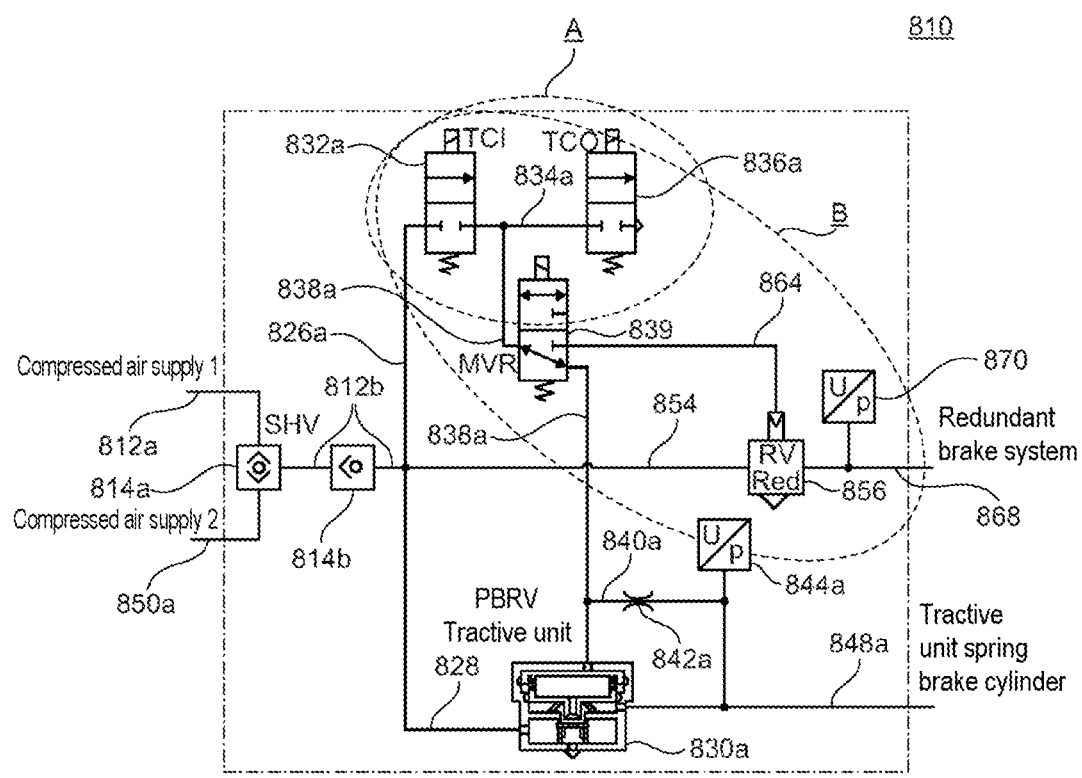
FIG. 7b shows a ninth exemplary embodiment of a parking brake device according to the invention.

FIG. 7b shows a ninth exemplary embodiment of a parking brake device 810 according to the invention.

The parking brake device 810 substantially corresponds to the eighth exemplary embodiment according to FIG. 7a.

Equivalent features are denoted by a reference sign increased by the value 100 in comparison with FIG. 7a.

The ninth exemplary embodiment of the parking brake device 810 shown in FIG. 7b is also a so-called "rigid" embodiment which does not provide any relay valve assembly for a trailer.

The control valves 832a, 836a, as well as the 3/2-way control valve 839, by virtue of the double actuation functionality thereof for the tractive unit relay valve 830a or the redundancy relay valve 856, must be able to be independently actuated by the control electronics module A as well as by the control electronics module B.

The pressure signals of the pressure sensors 844a, 870 for the tractive unit relay valve 830a, or redundancy relay valve 856, respectively, are detected only by the control electronics module B.

In terms of the first fallback plane, the control electronics module B is configured in such a manner that the latter in the event of a defect or a (partial) failure of the electronic actuation of the service brake device can nevertheless actuate the latter by way of the additional electropneumatic modulator and in particular by way of the redundancy relay valve 856.

In this case however, the control electronics module B first has to switch the 3/2-way valve 839 (switch position not shown in FIG. 7b) such that said control electronics module B by means of the two control valves 832a, 836a can actuate the redundancy relay valve 856.

The actuation of the redundancy relay valve 856 then takes place in such a manner that the service brakes of each axle of the utility vehicle, in particular of the tractive unit, can continue to be actuated.

The second fallback plane, in terms of construction, is configured so as to be based on the first fallback plane.

Said second fallback plane is configured in such a manner that in the event of an additional defect, or of a (partial) failure, respectively, of the control electronics module B of the electropneumatic modulator the still intact and independent control electronics module A first controls or moves, respectively, the 3/2-way valve 839 back to the switch position illustrated according to FIG. 7b.

Consequently, the two control valves 832a, 836a of the tractive unit relay valve 830a can now be actuated in such a manner that the spring brake cylinders of the tractive unit can still be braked in steps.

These two fallback planes become effective or advantageous, respectively, in particular when the electronic actuation of the service brake device of the utility vehicle takes place autonomously, i.e. without the intervention of a driver.

Figure 8:
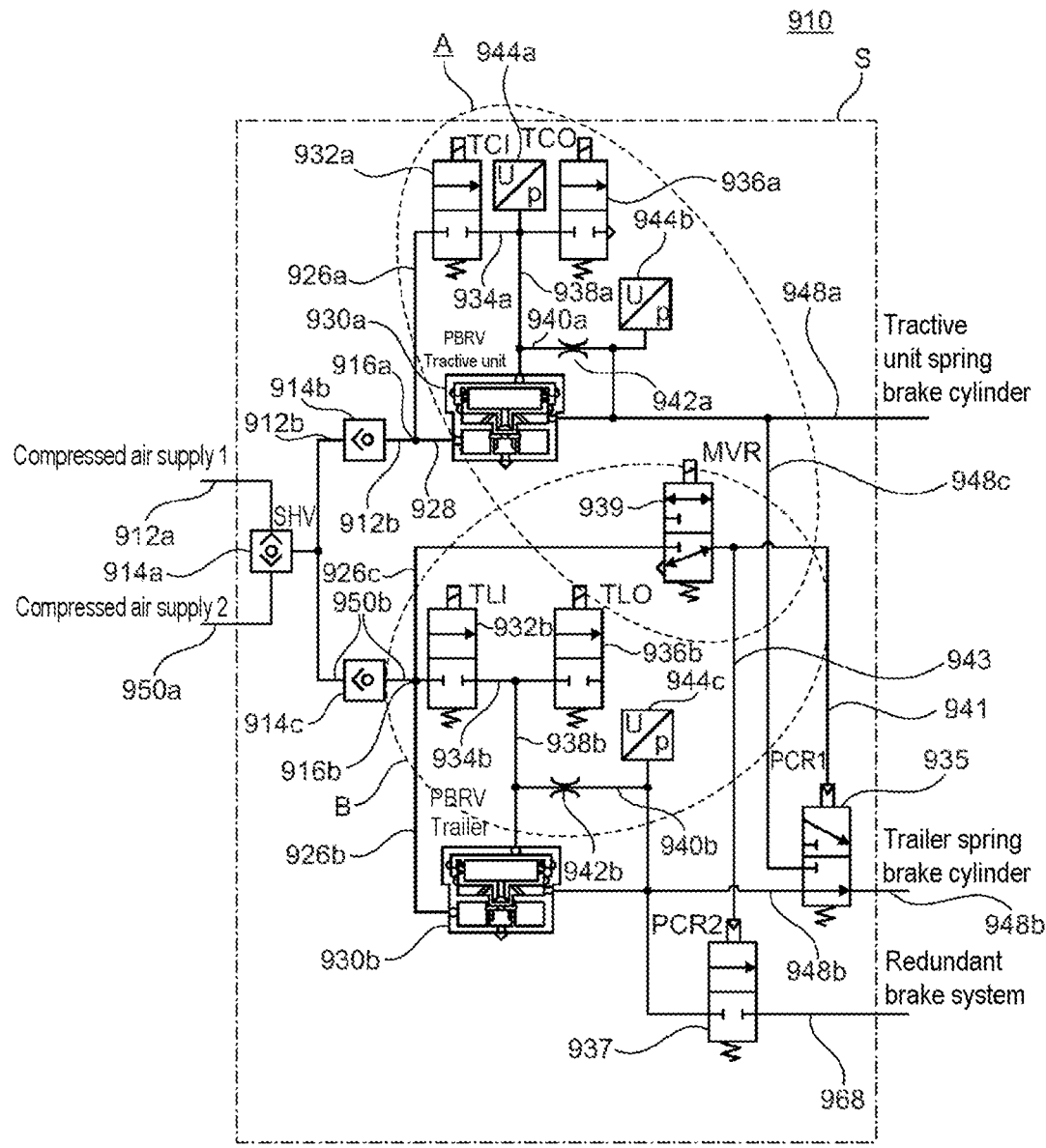
FIG. 8 shows a tenth exemplary embodiment of a parking brake device according to the invention.

FIG. 8 shows a tenth exemplary embodiment of a parking brake device 910 according to the invention.

The tenth exemplary embodiment of a parking brake device 910 substantially has the same structural and functional features as the exemplary embodiment shown in FIG. 5a.

Equivalent elements and features are provided with identical reference signs but increased by the value 500.

There are however the following differences in structural and/or functional terms:

In principle, the respective relay valve assemblies for the actuation of the spring brake cylinders of the tractive unit as well as of the trailer are of a construction identical to that of the fifth exemplary embodiment according to FIG. 5a.

Here however, the valves 935 and 937 (PCR1, PCR2) are provided for actuating the redundant brake system.

The valve 937 is configured as a 2/2-way valve which can be pneumatically actuated.

The pneumatic actuation of this valve 937 in the release position thereof however takes place only in the case of the first fallback plane, such that the 3/2-way valve (MVR) 939 would consequently be in the ventilating switch state thereof (not shown in FIG. 8).

The valve 935 has a first operating input, which by means of a branch line 948c is supplied by way of the line 948a, as well as a further operating input which is supplied with compressed air substantially by way of the output line 948b as well as the at least partially opened switch state of the trailer relay valve 930b.

By way of the control valve 935 it is thus possible to be able to correspondingly actuate the spring brake cylinders of the trailer either by way of the output line 948a for actuating the tractive unit spring brake cylinders or by way of the trailer relay valve 930b.

Consequently, the valves 935, 937, according to the circuit diagram thereof, are simultaneously supplied with air or vented by the 3/2-way valve 939 as a function of whether the 3/2-way valve 939 is switched to the ventilating or ventilation state thereof.

The control valves 932a, 936a for the tractive unit relay valve 930a as well as the 3/2-way control valve 939, according to FIG. 8, can be independently actuated by the control electronics module A.

The control valves 932b, 936b for the trailer relay valve 930b as well as the 3/2-way control valve 939 are independently actuated by the control electronics module B.

In terms of the first fallback plane, the control electronics module B is specified in such a manner that the latter in the event of a defect or a (partial) failure of the electronic actuation of a service brake device can nevertheless actuate the latter by way of the additional electropneumatic modulator and in particular by way of the redundancy relay valve 956.

In this case however, the control electronics module B first has to switch the 3/2-way valve 939 (switch position not shown in FIG. 8), whereupon the control valve 937 is switched to the release position thereof.

As a result, the two control valves 932b, 936b can effectively actuate the relay valve 930b of the trailer, said relay valve 930b according to the first fallback plane configuring the redundancy relay valve and being able to actuate the redundant brake system by way of the now opened output line 968.

The actuation of the trailer relay valve 930b as the redundancy relay valve then takes place in such a manner that the service brakes of each axle of the utility vehicle, in particular of the tractive unit, can continue to be actuated.

In terms of the first fallback plane, the control valve 935 in the output line 948b is furthermore switched such that the trailer relay valve 930b in this fallback plane can no longer actuate the spring brake cylinders of the trailer.

The actuation of the spring brake cylinders of the trailer according to the first fallback plane takes place by way of the relay valve 930a of the tractive unit and by way of the branch line 948c which in this fallback plane is connected to the output line 948b.

The second fallback plane, in terms of construction, is configured so as to be based on the first fallback plane.

Said second fallback plane is configured in such a manner that in the event of an additional defect, or of a (partial) failure, respectively, of the control electronics module B of the electropneumatic modulator the still intact and independent control electronics module A first controls or moves, respectively, the 3/2-way valve 939 back to the switch position illustrated according to FIG. 8.

Consequently, the two valves 935, 937 actuated by the 3/2-way valve 939 are also switched back to the position of the former shown according to FIG. 8, as a result of which all output lines 948b, 968 for the trailer relay valve 930b are blocked.

The two control valves 932a, 936a of the tractive unit relay valve 930a by means of the control electronics module A can thus now be actuated in such a manner that the spring brake cylinders of the tractive unit can still be braked in steps (by way of the output line 948a).

Since the output line 948a by way of the branch line 948c is now connected to the further output line 948b, the spring brake cylinders of the trailer by way of the tractive unit relay valve 930a can also be controlled in the same manner as those of the tractive unit.

It becomes evident from the explanations above that the 3/2-way control valve 939 must be actuated by the control electronics module A as well as by the control electronics module B.

This is therefore necessary because the control valve 937 in the case of the first fallback plane cannot otherwise release the output line 968 to the redundant brake system and the first fallback plane would thus be ineffective.

In the case of the second fallback plane, it is absolutely necessary that the control valve 935 is switched from the position according to the first fallback plane (not shown in FIG. 8) back to the position thereof illustrated according to FIG. 8 in order for the spring brake cylinders of the trailer to continue to be able to be actuated at least in steps.

These two fallback planes become effective or advantageous, respectively, in particular when the electronic actuation of the service brake device of the utility vehicle takes place autonomously, i.e. without the intervention of a driver.

Figure 9:
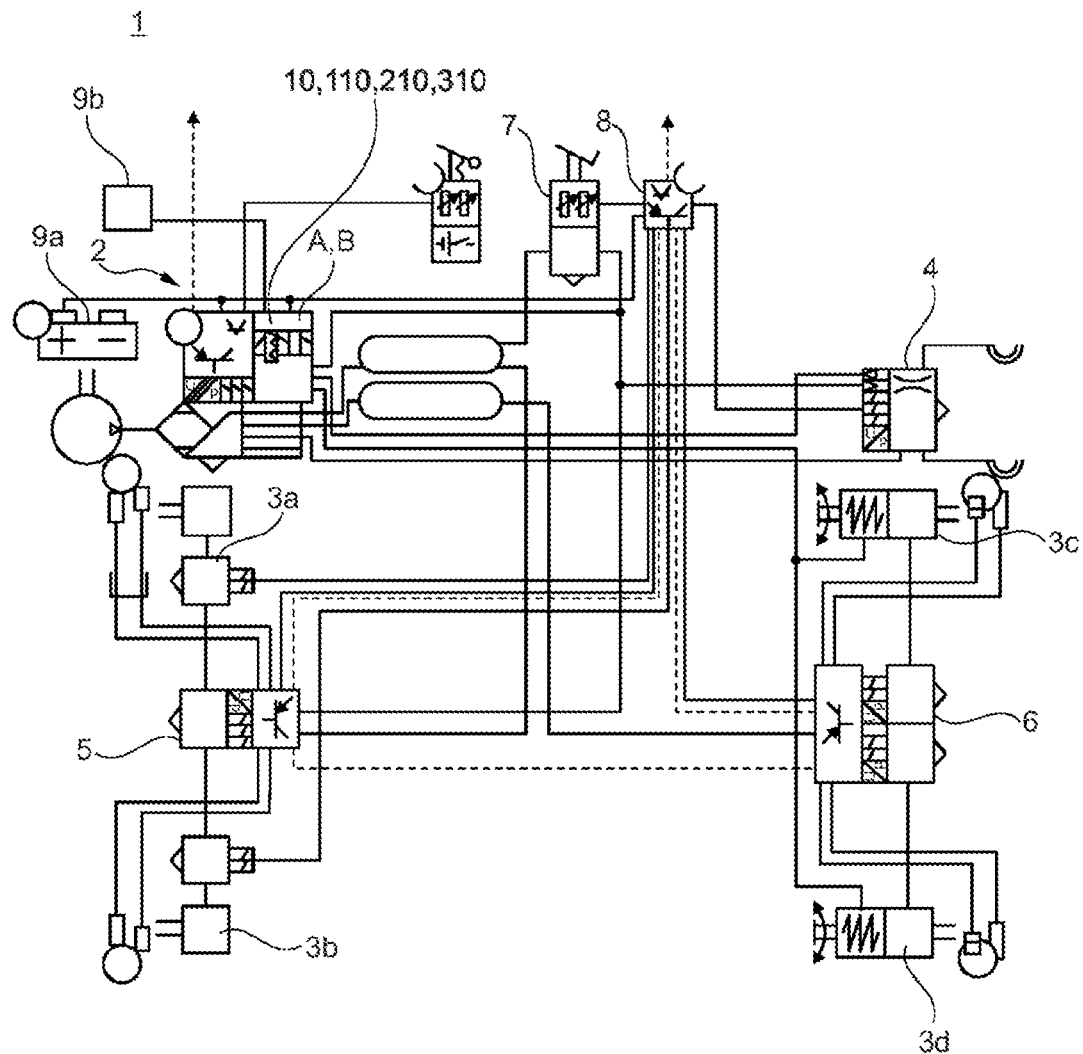
FIG. 9 shows a first exemplary embodiment of an electronic brake device according to the invention, having a parking brake device according to the invention according to FIGS. 1 to 4.

FIG. 9 shows a first exemplary embodiment of a redundant brake system 1 according to the invention, having a parking brake device according to the invention according to FIGS. 1 to 4, and having a service brake device.

This brake system 1 has an air preparation unit 2 which furthermore comprises the parking brake device 10, 110, 210, 310 according to the invention according to FIGS. 1 to 4.

It is however not necessarily needed for the parking brake device 10, 110, 210, 310 to be a component part of the air preparation unit 2.

Rather, the parking brake device 10, 110, 210, 310 can also be embodied as a separate device.

The parking brake device 10, 110, 210, 310 by way of the redundancy output line (see reference signs 68, 168, 268, 368 of FIGS. 1 to 4), or the redundancy output connector, respectively, by way of corresponding lines (not shown in FIG. 9) is connected directly to the service brake cylinders 3a, 3b of the front axle of a utility vehicle.

Additionally or alternatively, the parking brake device 10, 110, 210, 310 by way of the redundancy output line, or the redundancy output connector, respectively, by way of corresponding lines (likewise not shown in FIG. 9) is connected to the service brake cylinders 3c, 3d of the rear axle of a utility vehicle.

Alternatively or additionally, it is conceivable that the parking brake device 10, 110, 210, 310 is connected to the corresponding service brake cylinders 3a, 3b, 3c, 3d only by way of an electropneumatic 1-channel modulator 5 of the front axle and/or by way of an electropneumatic 2-channel modulator 6 of the rear axle.

The brake system 1 furthermore has a trailer control module 4 which is connected to the parking brake device 10, 110, 210, 310.

A dedicated trailer relay valve 430b, 630b, 730b, 930b according to the fifth, seventh, eighth and tenth exemplary embodiment of the parking brake device 410, 610, 710, 910 can thus be dispensed with.

Alternatively, it is conceivable for the trailer control module 4 to be dispensed with and the parking brake device 410, 610, 710, 910 according to the fifth, seventh, eighth and tenth exemplary embodiment to be provided in the brake system 1 instead.

The electronic brake system 1 furthermore has a foot brake module 7 which by way of a compressed air vessel is connected to the air preparation unit 2 and is furthermore connected to the electropneumatic 1-channel modulator 5 and/or the electropneumatic 2-channel modulator 6.

Moreover provided is a control unit 8 which serves inter alia for actuating the trailer control module 4, the electropneumatic 1-channel modulator 5 and the electropneumatic 2-channel modulator 6.

The parking brake device 10, 110, 210, 310 according to the invention moreover comprises the control electronics modules A and B which are in each case supplied with electric power by a separate, i.e. galvanically separate, current source 9a, 9b and the function of said control electronics modules A and B has been explained in the descriptions of the figures pertaining to FIGS. 1 to 9.

LIST OF REFERENCE SIGNS

1 Electronic brake system
2 Air preparation unit
3a Service brake cylinder
3b Service brake cylinder
3c Service brake cylinder
3d Service brake cylinder
4 Trailer control module
5 Electropneumatic 1-channel modulator
6 Electropneumatic 2-channel modulator
7 Foot brake module
8 Electronic control unit
9a Electric power source
9b Electric power source
10 Parking brake device
12a Compressed air supply
12b First connector line
14a Select-high valve
14b Stop valve
14c Stop valve
16 Branching point
18 Line
20 Control valve
22 Control valve
24 Line
26 Line
28 Line
30 Bistable valve
32 Control valve
34 Line
36 Control valve
38 Line
40 Line
42 Throttle
44 Pressure sensor
46 Line
48 Line
50a Compressed air supply
50b Second connector line
52 Nodal point
54 Line
56 Relay valve
58 Solenoid valve
60 Line
62 Nodal point
64 Line
66 Solenoid valve
68 Brake system
70 Pressure sensor
S System limit
A Control electronics module
B Control electronics module
110 Parking brake device
112a Compressed air supply
112b First connector line
114a Select-high valve
114b Stop valve
114c Stop valve
116 Branching point
118 Line
120 Control valve
122 Control valve
124 Line
125 Line
126 Line
128 Line 130 Bistable valve
132 Control valve
134 Line
136 Control valve
138 Line
140 Line
142 Throttle
144 Pressure sensor
146 Line
148 Line
150a Compressed air supply
150b Second connector line
152 Nodal point
154 Line
156 Relay valve
158 Solenoid valve
160 Line
162 Nodal point
164 Line
166 Solenoid valve
168 Brake system
170 Pressure sensor
210 Parking brake device
212a Compressed air supply
212b First connector line
214a Select-high valve
214b Stop valve
214c Stop valve
216 Branching point
218 Line
220 Control valve
222 Control valve
224 Line
225 Line
226 Line
228 Line
230 Bistable valve
232 Control valve
234 Line
236 Control valve
238 Line
240 Line
242 Throttle
244 Pressure sensor
246 Line
247 Line
248 Line
250a Line, or compressed air supply, respectively
250b Second connector line
252 Nodal point
254 Line
256 Relay valve
258 Solenoid valve
260 Line
262 Nodal point
264 Line
266 Solenoid valve
268 Brake system
270 Pressure sensor
310 Parking brake device
312a Compressed air supply
312b First connector line
314a Select-high valve
314b Stop valve
316 Branching point
318 Line
320 Control valve
322 Control valve
324 Line
326 Line
328 Line
330 Bistable valve
332 Control valve
334 Line
336 Control valve
338 Line
340 Line
342 Throttle
344 Pressure sensor
346 Line
348 Line
350a Line, or compressed air supply, respectively
352 Nodal point
354 Line
356 Relay valve
358 Solenoid valve
360 Line
362 Nodal point
364 Line
366 Solenoid valve
368 Brake system
370 Pressure sensor
410 Parking brake device
412a Compressed air supply
412b First connector line
414a Select-high valve
414b Stop valve
414c Stop valve
416a Branching point
416b Branching point
426a Line
426b Line
428a Line
428b Line
430a Bistable valve
430b Bistable valve
432a Control valve
432b Control valve
434a Line
434b Line
436a Control valve
436b Control valve
438a Line
438b Line
440a Line
440b Line
442a Throttle
442b Throttle
444a Pressure sensor
444b Pressure sensor
444c Pressure sensor
448a Line
448b Line
450a Compressed air supply
450b Second connector line
452 Nodal point
454 Line
456 Relay valve
458 Solenoid control valve
460 Line
462 Nodal point
464 Line
466 Solenoid control valve
468 Brake system 470 Pressure sensor
510 Parking brake device
512a Compressed air supply
512b First connector line
514a Select-high valve
514b Stop valve
526a Line
526b Line
528 Line
530a Bistable valve
532a Control valve
534a Line
536a Control valve
538a Line
540a Line
542a Throttle
544a Pressure sensor
544b Pressure sensor
548a Line
550a Compressed air supply, or second connector line, respectively
552 Nodal point
554 Line
556 Relay valve
558 Solenoid control valve
560 Line
562 Nodal point
564 Line
566 Solenoid control valve
568 Brake system
570 Pressure sensor
610 Parking brake device
612a Compressed air supply
612b First connector line
614a Select-high valve
614b Stop valve
614c Stop valve
616a Branching point
616b Branching point
626a Line
626b Line
628a Line
630a Bistable valve
630b Bistable valve
632a Control valve
632b Control valve
634a Line
634b Line
636a Control valve
636b Control valve
638a Line
638b Line
639 3/2-way control valve
640a Line
640b Line
642a Throttle
642b Throttle
644a Pressure sensor
644b Pressure sensor
644c Pressure sensor
648a Line
648b Line
650a Compressed air supply
650b Second connector line
652 Nodal point
654 Line
656 Relay valve
664 Line
668 Brake system
670 Pressure system
710 Parking brake device
712a Compressed air supply
712b First connector line
714a Select-high valve
714b Stop valve
714c Stop valve
716a Branching point
716b Branching point
726a Line
726b Line
728 Line
730a Bistable valve
730b Bistable valve
732a Control valve
732b Control valve
734a Line
734b Line
736a Control valve
736b Control valve
738a Line
738b Line
739 3/2-way control valve
740a Line
740b Line
742a Throttle
742b Throttle
744a Pressure sensor
744b Pressure sensor
744c Pressure sensor
748a Line
748b Line
750a Compressed air supply
750b Second connector line
754 Line
756 Relay valve
764 Line
768 Brake system
770 Pressure sensor
810 Parking brake device
812a Compressed air supply
812b First connector line
814a Select-high valve
814b Stop valve
826a Line
828 Line
830a Bistable valve
832a Control valve
834a Line
836a Control valve
838a Line
839 3/2-way control valve
840a Line
842a Throttle
844a Pressure sensor
848a Line
850a Compressed air supply
854 Line
856 Relay valve
864 Line
868 Brake system
870 Pressure sensor
910 Parking brake device
912a Compressed air supply
912b First connector line 914a Select-high valve
914b Stop valve
914c Stop valve
916a Branching point
916b Branching point
926a Line
926b Line
928 Line
930a Bistable valve
930b Bistable valve
932a Control valve
932b Control valve
934a Line
934b Line
935 Control valve
936a Control valve
936b Control valve
937 Control valve
938a Line
938b Line
939 3/2-way control valve
940a Line
940b Line
941 Control line
942a Throttle
942b Throttle
943 Control line
944a Pressure sensor
944b Pressure sensor
944c Pressure sensor
948a Line
948b Line
948c Branch line
950a Compressed air supply
950b Second connector line
968 Brake system

What is claimed is:

1. A parking brake device, comprising:
at least one first connector line to a compressed air source;
at least one second connector line to a compressed air source;
at least one electronically actuatable bistable valve assembly for actuating a spring brake cylinder;
at least one electronically actuatable redundancy control valve assembly for actuating a redundant brake system; and
at least one first control electronics module and at least one second control electronics module, which are able to be operated independently of one another, wherein
the bistable valve assembly is able to be actuated via the first control electronics module and, independently thereof, the redundancy control valve assembly is able to be actuated via the second control electronics module.

2. The parking brake device as claimed in claim 1, wherein
the bistable valve assembly comprises at least one control valve which is configured and specified such that at least one control line of a bistable valve of the bistable valve assembly is able to be controlled, and
the control line is able to be connected to a compressed air source.

3. The parking brake device as claimed in claim 2, wherein
the bistable valve assembly comprises at least one second control valve which is configured and specified in such a manner that the control line of the bistable valve is able to be vented.

4. The parking brake device as claimed in claim 3, wherein
the second control valve is able to be actuated via the first control electronics module.

5. The parking brake device as claimed in claim 3, wherein
the control valve conjointly serves for actuating the bistable valve as well as for actuating the redundancy control valve.

6. The parking brake device as claimed in claim 3, wherein
the second control valve conjointly serves for actuating the bistable valve as well as for actuating the redundancy control valve.

7. The parking brake device as claimed in claim 2, wherein
the control valve is able to be actuated via the first control electronics module.

8. The parking brake device as claimed in claim 1, wherein
the redundancy control valve assembly comprises at least one control valve which is configured and specified in such a manner that at least one control line of a redundancy control valve is able to be controlled.

9. The parking brake device as claimed in claim 8, wherein
the redundancy control valve assembly comprises at least one second control valve which is configured and specified in such a manner that the control line of the redundancy control valve is able to be vented.

10. The parking brake device as claimed in claim 9, wherein
the second control valve is able to be actuated via the second control electronics module.

11. The parking brake device as claimed in claim 9, wherein
a third control valve and a fourth control valve are connected, or able to be connected, to the first connector line, and/or
the control valve and the second control valve are connected, or able to be connected, to the second connector line.

12. The parking brake device as claimed in claim 9, wherein
a third control valve and a fourth control valve and the control valve and the second control valve are connected, or able to be connected, to the first connector line.

13. The parking brake device as claimed in claim 8, wherein
the control valve is able to be actuated via the second control electronics module.

14. The parking brake device as claimed in claim 1, wherein
the first connector line is connected, or able to be connected, to a first compressed air source, and
the second connector line is connected, or able to be connected, to a second compressed air source different from the first compressed air source.

15. The parking brake device as claimed in claim 1, wherein
the first connector line and the second connector line are connected to the same compressed air source.

* * * * *